(Model.)

P. G. BECKLEY.
WICK TRIMMER.

No. 249,820. Patented Nov. 22, 1881.

Witnesses:
Charles H. Pell
S. R. Steadman

Inventor:
Philip G. Beckley
By Horace Harris Atty.

UNITED STATES PATENT OFFICE.

PHILIP G. BECKLEY, OF NEWARK, NEW JERSEY, ASSIGNOR OF ONE-HALF TO JOSEPH McKAY & CO., OF SAME PLACE.

WICK-TRIMMER.

SPECIFICATION forming part of Letters Patent No. 249,820, dated November 22, 1881.

Application filed April 27, 1881. (Model.)

*To all whom it may concern:*

Be it known that I, PHILIP G. BECKLEY, of Newark, in the county of Essex and State of New Jersey, have invented a new and useful Improvement in Lamp-Trimmers, of which the following is a specification.

My invention relates to a tool for trimming lamps; and it consists in a frame embracing a handle, guide, and rests, adapted to rest in the slot in the top of the cone, and a cutting-plate, and in a movable cutter operated by a spring-lever, the cutting being on the principle of shears.

Figure 1:
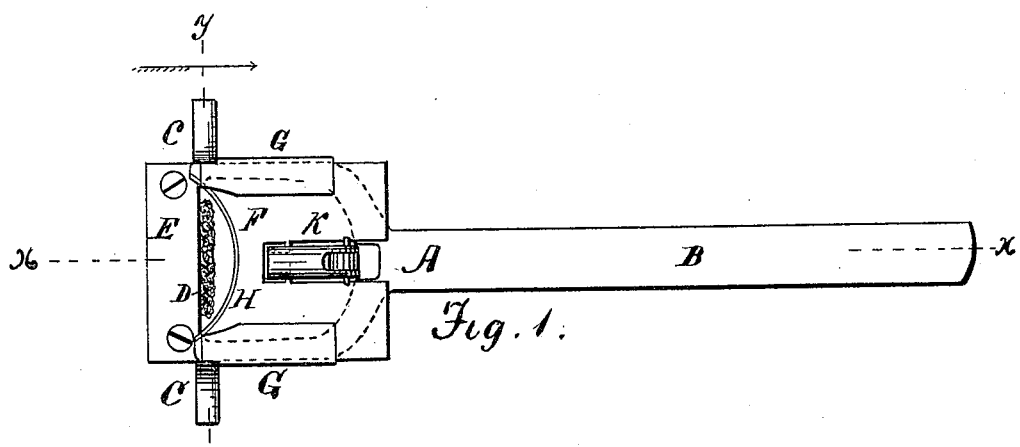
Figure 2:
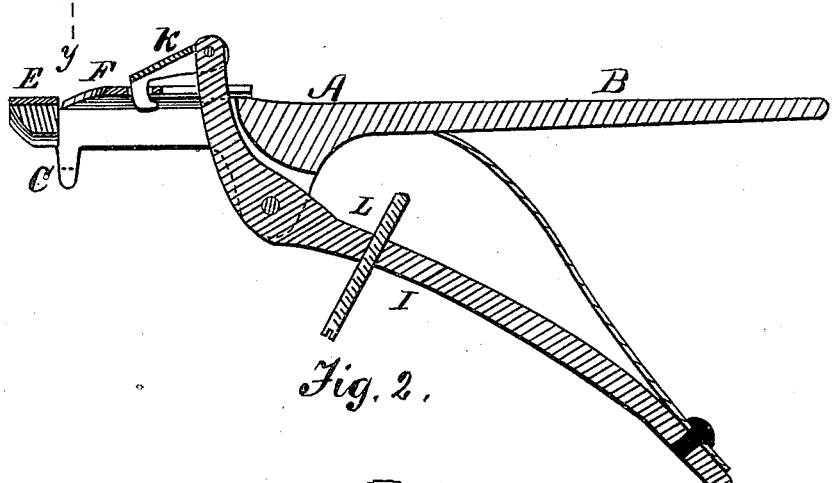
Figure 3:
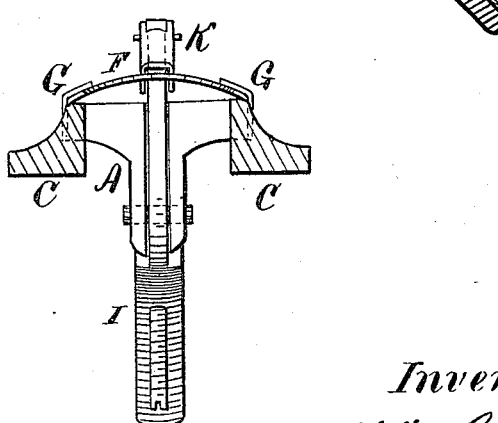

Figure 1 is a plan. Fig. 2 is a longitudinal section on a line of *x x* on Fig. 1. Fig. 3 is a cross-section of Fig. 1 on a line of *y*.

In my construction I make a stiff frame, A, having the handle B and rest and guide C, to place on the top of the lamp in the slot of the cone, a section of said rest coming on each side of the wick D.

On the front end of the frame is secured a cutting-plate, E, curved upward to conform to the rounded form of cutting the top of the wick. Back of this plate, and having the same curved form, is arranged a sliding cutter, F, sliding in the spring-ways G, and having a circular recessed cutting-edge, H; or the recess may be varied from a circular form.

To the handle B is pivoted the spring-lever I, having jointed to it at the end above the frame a dog, K, with an end made to engage the sliding cutter, and so arranged that when the lever, in the hand of the operator, is pressed up toward the handle this dog will press down upon the cutter and push it forward, so that the cutting-edge shall from each end pass shear-like over the sharp edge of the cutting-plate. The ways G, having the ends at the cutting-edge of the cutter F made to spring down on the cutter and the dog pressing upon the cutter, serve to make a close cutting connection between the cutter and cutter-plate. The top of the wick D is cut off smoothly by one action of the lever.

L is a stop, to check the movement of the lever.

The end of the cutter is made circular, in order to confine the wick and not allow it to slip laterally when it is being cut; but, as before stated, I do not confine myself to this circular recess in the end of the cutter, and, besides, the cutter may have a straight cut diagonally across the end, in which case the cutting will begin and extend from one side only.

The arrangement of the cutter and of the lever may each be modified, and the same effect be produced in combination with the frame and the cutting-plate.

I claim—

1. The combination, with the lever I and frame A, carrying the handle B and cutting-plate E, of the rest and guide C, adapted to rest in the slot in the top of the cone, substantially as and for the purpose specified.

2. The combination, with the lever I and frame A, as set forth, of the sliding cutter F and spring-ways G, substantially as and for the purpose set forth.

3. The combination, with the frame A, substantially as described, of the lever I, having the dog K, with its end working on the upper surface of the sliding cutter F, substantially as and for the purpose named.

PHILIP G. BECKLEY.

Witnesses:
HORACE HARRIS,
S. R. STEADMAN.